2,815,336
VULCANISATION OF 2-CHLOROBUTADIENE-(1,3) POLYMERS

Helmut Freytag, Koln-Stammheim, Friedrich Lober, Leverkusen-Bayerwerk, and Richard Wegler and Julius Peter, Leverkusen, Germany, assignors to Farbenfabriken Bayer Aktiengesellschaft, Leverkusen, Germany, a corporation of Germany No Drawing. Application June 30, 1955,
Serial No. 519,233
Claims priority, application Germany July 6, 1954
6 Claims. (Cl. 260—92.3)

This invention relates to the vulcanisation of 2-chlorobutadiene-(1,3) polymers.

Metal oxides, for example zinc oxide or lead oxide, are used for vulcanising polymers of 2-chlorobutadiene-(1,3) (or chloropropene), or of copolymers thereof with vinyl or diene compounds in which 2-chlorobutadiene-(1,3) is the predominant component. The metal oxides, however, do not always produce satisfactory results, and in particular the mechanical values of the resulting vulcanisates usually do not conform to practical requirements.

Organic compounds which are added as accelerators to polymers or copolymers of 2-chlorobutadiene-(1,3), examples of such compounds being hexamethylene tetramine, butyraldehyde amine accelerators, pyrocatechol and its derivatives, such as the di-o-tolyl guanidine salt of pyrocatechol boric acid, and also 4,4'-diaminodiphenyl methane, frequently show a pronounced tendency to cause the vulcanisation to begin prematurely. Other disadvantages are that the mechanical properties of the vulcanisate obtained are inadequate.

Cyclic thioureas and their N.N'-dimethyl substitution products, more especially ethylene thiourea (2-mercaptoimidazoline) and corresponding derivatives with a greater number of carbon elements have also been proposed and used as accelerators for polymers and copolymers of 2-chlorobutadiene-(1,3), and in this respect reference is made to United States Patent No. 2,544,746. However, these compounds are comparatively expensive to manufacture.

It is an object of the present invention to provide a new class of vulcanisation accelerators.

It is another object to provide effective accelerators for the vulcanisation of 2-chlorobutadiene-(1,3) polymers.

It is still another object to provide effective accelerators for the vulcanisation of 2-chlorobutadiene-(1,3) polymers and copolymers thereof with vinyl or diene compounds.

Further objects will become apparent from the following description.

It has now been found that compounds which are effective accelerators for polymers and copolymers of 2-chlorobutadiene-(1,3) and which can be prepared in a simple manner are hexahydrotriazine compounds which have the general Formulae I and II:

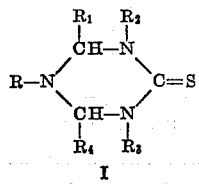

I

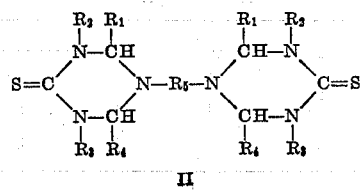

II where R represents a hydrogen atom, saturated or unsaturated straight-chain or branched alkyl radical with 1–6 carbon atoms, a hydroxyalkyl or aminoalkyl radical, or a corresponding radical, the carbon chains of which are broken by the hetero-atoms oxygen, nitrogen or sulphur, or an aralkyl, cycloalkyl or heterocyclic radical; $R_1$ is the same as $R_4$, and represents a hydrogen atom, an alkyl radical with 1–6 carbon atoms or an aryl radical or cycloalkyl radical; $R_2$ is the same as or different from $R_3$, and represents a hydrogen atom, an alkyl radical with 1–6 carbon atoms or an aryl, cycloalkyl or aralkyl radical; $R_5$ represents an alkylene radical with 1–6 carbon atoms, which can be broken by hetero-atoms, such as oxygen, sulphur or nitrogen, or it can represent a direct $>N-N<$ bond. These compounds are also characterised by the fact that they have no discolouring properties and are odourless, and also by a high degree of safety in working up. They also impart very good mechanical properties to the vulcanisates.

Compounds of the above type are described by Pacquin (Ang. Ch. (A) 60 (1948) 267–271) and, following the instructions set out therein, these compounds can easily be obtained by the condensation of one mol of thiourea or a mono- or disubstitution product thereof (for example a diphenyl-, phenyl-, cyclohexyl-, dicyclohexyl-, methyl-, dimethyl-, dibutyl-, or benzyl-thiourea) with 2 mols of an aldehyde, more especially formaldehyde or acetaldehyde, or even benzaldehyde or hexahydrobenzaldehyde, and 1 mol of a primary amine (methyl-, ethyl-, propyl-, isopropyl-, butyl-, isobutyl-, allyl-, benzyl-, hexahydrobenzyl-, or furfuryl-amine or ammonia). The "bis-compounds" of the type shown in Formula II are correspondingly prepared by the reaction of an aldehyde and a thiourea with a diamine or hydrazine.

Accordingly, the present invention provides a process for the vulcanisation of polymers of 2-chlorobutadiene-(1,3), or copolymers thereof with vinyl or diene compounds, wherein a condensation product of a thiourea, an aliphatic or aromatic aldehyde, and a primary monoamine or diamine, ammonia or hydrazine, is used as a vulcanisation accelerator. The possibilities of variation in the preparation of the triazine compounds are practically unlimited.

The condensation products of type I are soluble in organic solvents such as methanol and dioxane. Owing to the fact that they are generally water-soluble, they can with advantage be introduced into latices of 2-chlorobutadiene-(1,3) polymers.

For the production of vulcanisable mixtures, the products I and II can be incorporated as such into the polymers, or if desired can be incorporated in admixture with suitable plasticisers, such as those usually employed for the working up of these polymers, or with fillers. The accelerators used in the process of the present invention are used in amounts of about 0.2–5%, preferably 0.5–2%, calculated on the polymer. They are suitable for use in mixtures containing carbon black and also for use in mixtures with light fillers.

Some of these perhydrotriazine compounds which are suitable for use as accelerators are mentioned below by way of example:

2-thio-5-methyl perhydrotriazine-(1,3,5), M. P. 170–171° C. (with decomposition)
2-thio-5-ethyl perhydrotriazine-(1,3,5), M. P. 170–171° C. (with decomposition)
2-thio-5-propyl perhydrotriazine-(1,3,5), M. P. 171–172° C. (with decomposition)
2-thio-5-allyl perhydrotriazine-(1,3,5), M. P. 175–176° C. (with decomposition)
2-thio-5-butyl-perhydrotriazine-(1,3,5), M. P. 167–169° C. (with decomposition)

2-thio-5-isobutyl perhydrotriazine-(1,3,5), M. P. 140–142° C.
2-thio-5-cyclohexyl perhydrotriazine-(1,3,5), M. P. 176° C.
2-thio-5-hydroxyethyl perhydrotriazine-(1,3,5), M. P. 158–160° C.
2-thio-3,5-dimethyl perhydrotriazine-(1,3,5), M. P. 141–143° C.
2-thio-1-phenyl-5-methyl perhydrotriazine-(1,3,5), M. P. 168–169° C. (with decomposition)
2-thio-5-hexahydrobenzyl perhydrotriazine-(1,3,5), M. P. 144–145° C.
2-thio-4,5,6,-trimethyl perhydrotriazine-(1,3,5), M. P. 164–166° C. (with decomposition)
2-thio-5-benzyl perhydrotriazine-(1,3,5), M. P. 183–184° C.
2-thio-1,3-diphenyl - 5 - methyl - perhydrotriazine-(1,3,5), M. P. 180–182° C.
2-thio-4,6-dimethyl perhydrotriazine-(1,3,5), M. P. 180° C. (with decomposition)
Sym. ethylene-bis-(2-thio-perhydrotriazine-(1,3,5), M. P. 209–210° C. (with decomposition)
Sym. hexamethylene - bis - (2 - thio - perhydrotriazine-(1,3,5)), M. P. 180–181° C. (with decomposition) (M. P. uncorrected)
2-thio - 4,6 - dicyclohexyl - 5 - methyl - perhydrotriazine-(1,3,5), M. P. 163–165° C.

The accelerating effect of this class of compounds is clearly apparent from a comparison of the mechanical values of unaccelerated mixtures and mixtures accelerated with, for example, 2-thio-5-methyl-perhydrotriazine-(1,3,5). The mechanical values were compared in mixtures with carbon black and mixtures with inactive carbon black.

The following examples further illustrate the invention, but do not limit same:

*Example 1*

Mixtures with active carbon black:

| | A | B |
|---|---|---|
| Chloroprene polymer | 100.0 | 100.0 |
| Zinc oxide | 3.0 | 3.0 |
| Magnesium oxide | 4.0 | 4.0 |
| Active carbon black | 30.0 | 30.0 |
| Phenyl-naphthylamine | 2.0 | 2.0 |
| Stearic acid | 0.5 | 0.5 |
| 2-thio-5-methyl-perhydrotriazine-(1,3,5) | | 0.5 |

| Pressure | Minutes | Tensile strength, kg./cm.² | | Elongation, percent | | Loading at— | | | |
|---|---|---|---|---|---|---|---|---|---|
| | | | | | | 300% | | 500% | |
| | | A | B | A | B | A | B | A | B |
| 1.5 | 5 | 14 | 23 | 1,500 | 1,235 | 3 | 5 | 6 | 7 |
| 1.5 | 10 | 18 | 39 | 1,320 | 1,005 | 3 | 8 | 6 | 19 |
| 1.5 | 25 | 33 | 111 | 870 | 750 | 9 | 30 | 21 | 69 |
| 1.5 | 50 | 54 | 170 | 810 | 655 | 18 | 54 | 36 | 126 |

| Pressure | Minutes | Tensile strength, kg./cm.² | | Elongation, percent | | Loading at— | | | |
|---|---|---|---|---|---|---|---|---|---|
| | | | | | | 300% | | 500% | |
| | | A | B | A | B | A | B | A | B |
| 3.5 | 5 | 36 | 134 | 930 | 745 | 9 | 36 | 21 | 81 |
| 3.5 | 10 | 71 | 198 | 855 | 705 | 22 | 62 | 43 | 143 |
| 3.5 | 15 | 93 | 228 | 770 | 640 | 27 | 75 | 63 | 174 |
| 3.5 | 20 | 147 | 258 | 710 | 610 | 42 | 90 | 99 | 207 |
| 3.5 | 40 | 183 | 255 | 655 | 525 | 54 | 108 | 129 | 243 |
| 3.5 | 60 | 189 | 252 | 655 | 495 | 57 | 114 | 141 | |

| Pressure | Minutes | Shore hardness | | Elasticity (percent Schopper) | |
|---|---|---|---|---|---|
| | | A | B | A | B |
| 3.5 | 5 | 45 | 55 | 37 | 37 |
| 3.5 | 10 | 51 | 59 | 37 | 40 |
| 3.5 | 15 | 55 | 60 | 36 | 41 |
| 3.5 | 20 | 56 | 62 | 36 | 40 |
| 3.5 | 40 | 60 | 64 | 35 | 40 |
| 3.5 | 60 | 60 | 64 | 35 | 40 |
| 3.5 | 90 | 61 | 64 | 35 | 40 |

| Pressure | Minutes | Permanent set after— | | | |
|---|---|---|---|---|---|
| | | 1 minute | | 1 hour | |
| | | A | B | A | B |
| 3.5 | 5 | above 100 | 29 | above 100 | 11 |
| 3.5 | 10 | 87 | 13 | 35 | 8 |
| 3.5 | 15 | 46 | 9 | 14 | 6 |
| 3.5 | 20 | 22 | 9 | 9 | 6 |
| 3.5 | 40 | 15 | 6 | 6 | 4 |
| 3.5 | 60 | 12 | 6 | 6 | 4 |
| 3.5 | 90 | 11 | 6 | 6 | 4 |

| | A | B |
|---|---|---|
| Defo | 300/13.0 | 330/12.3 |

*Example 2*

Mixtures with inactive carbon black:

| | A | B |
|---|---|---|
| Chloroprene polymer | 100.0 | 100.0 |
| Zinc oxide | 3.0 | 3.0 |
| Magnesium oxide | 4.0 | 4.0 |
| Inactive carbon black | 30.0 | 30.0 |
| Phenyl-α-naphthylamine | 2.0 | 2.0 |
| Stearic acid | 0.5 | 0.5 |
| 2-thio-5-methyl-perhydrotriazine-(1,3,5) | | 0.5 |

| Pressure | Minutes | Tensile strength, kg./cm.² | | Elongation, percent | | Loading at— | | | |
|---|---|---|---|---|---|---|---|---|---|
| | | | | | | 300% | | 500% | |
| | | A | B | A | B | A | B | A | B |
| 1.5 | 5 | | 3 | | 1,500 | | 3 | | 3 |
| 1.5 | 10 | 3 | 18 | 1,500 | 1,500 | 3 | 3 | 3 | 3 |
| 1.5 | 25 | 3 | 81 | 1,500 | 1,185 | 3 | 6 | 3 | 12 |
| 1.5 | 50 | 9 | 141 | 1,500 | 960 | 3 | 15 | 3 | 45 |
| 3.5 | 5 | 3 | 90 | 1,500 | 1,070 | 3 | 9 | 3 | 21 |
| 3.5 | 10 | 33 | 148 | 1,235 | 975 | 3 | 15 | 6 | 53 |
| 3.5 | 15 | 81 | 168 | 1,255 | 905 | 6 | 18 | 15 | 66 |
| 3.5 | 20 | 93 | 178 | 1,210 | 845 | 6 | 22 | 19 | 74 |
| 3.5 | 40 | 120 | 183 | 1,045 | 740 | 9 | 25 | 27 | 96 |
| 3.5 | 60 | 136 | 186 | 1,060 | 690 | 9 | 27 | 31 | 102 |
| 3.5 | 90 | 139 | 190 | 1,075 | 640 | 12 | 31 | 34 | 118 |

| Pressure | Minutes | Shore hardness | | Elasticity (percent Schopper) | |
|---|---|---|---|---|---|
| | | A | B | A | B |
| 3.5 | 5 | | 44 | | 47 |
| 3.5 | 10 | 41 | 49 | 38 | 47 |
| 3.5 | 15 | 45 | 49 | 39 | 48 |
| 3.5 | 20 | 46 | 50 | 39 | 48 |
| 3.5 | 40 | 49 | 51 | 38 | 48 |
| 3.5 | 60 | 49 | 53 | 38 | 49 |
| 3.5 | 90 | 49 | 54 | 38 | 49 |

| Pressure | Minutes | Permanent set after— | | | |
|---|---|---|---|---|---|
| | | 1 minute | | 1 hour | |
| | | A | B | A | B |
| 3.5 | 5 | | 34 | | 12 |
| 3.5 | 10 | above 100 | 13 | above 100 | 6 |
| 3.5 | 15 | 60 | 10 | 30 | 5 |
| 3.5 | 20 | 55 | 8 | 20 | 4 |
| 3.5 | 40 | 33 | 7 | 19 | 4 |
| 3.5 | 60 | 28 | 6 | 13 | 3 |
| 3.5 | 90 | 25 | 5 | 12 | 2 |

Example 3

In the mixture of Example 2, 2-thio-5-methyl-perhydrotriazine-(1,3,5) was replaced by the same amount (0.5 g./100 g. of polymer) of Substance C: 2-thio-5-allyl-perhydrotriazine-(1,3,5)
Substance D: 2-thio-5-isopropyl-perhydrotriazine-(1,3,5)
Substance E: 2-thio-5-benzyl-perhydrotriazine-(1,3,5)
Substance F: 2-thio-4,6-dimethyl-perhydrotriazine-(1,3,5)
Substance G: 2-thio-5-methyl-1,3-diphenyl-perhydrotriazine-(1,3,5)
Substance H: 2-thio-4,6-dicyclohexyl-5-methyl-perhydrotriazine-(1,3,5)
Substance J: 2-thio-3,5-dimethyl-perhydrotriazine-(1,3,5)

comprises using as a vulcanisation accelerator a compound of the group consisting of I

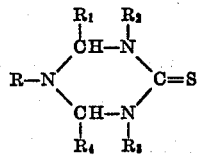

and II

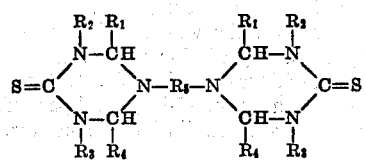

wherein R represents a member of the group consisting of a hydrogen atom, an alkyl radical with 1–6 carbon atoms, an alkylene radical with 1–6 carbon atoms, a hydroxyalkyl radical, an aminoalkyl radical, a radical thereof containing hetero-atoms in the chain, an aralkyl radical, a cycloalkyl radical and a heterocyclic radical; $R_1$ is the same as $R_4$, and represents a member of the group consisting of a hydrogen atom, an alkyl radical with 1–6 carbon atoms, an aryl radical and a cycloalkyl radical; each of $R_2$ and $R_3$ represents a member of the group consisting of a hydrogen atom, an alkyl radical with 1–6 carbon atoms, an aryl radical, a cycloalkyl radical and

| Pressure | Minutes | Tensile strength (kg./cm.²)—elongation (percent) | | | | | | | | | | | | | | | | |
|---|---|---|---|---|---|---|---|---|---|---|---|---|---|---|---|---|---|---|
| | | A | | C | | D | | E | | F | | G | | H | | J | | |
| 1.5 | 5 | | | | | | | | | 3 | 1,500 | 3 | 1,500 | | | | | |
| 1.5 | 10 | 3 | 1,500 | | | | | 3 | 1,500 | 18 | 1,500 | 30 | 1,370 | 57 | 1,340 | 36 | 1,340 | |
| 1.5 | 25 | 3 | 1,500 | | | 57 | 1,185 | 18 | 1,500 | 51 | 1,175 | 84 | 1,060 | 106 | 1,070 | 99 | 1,105 | 36 | 1,140 |
| 1.5 | 50 | 9 | 1,500 | 114 | 1,075 | 111 | 980 | 51 | 1,175 | 70 | 1,160 | 66 | 1,080 | 45 | 1,150 | 121 | 960 |
| 3.5 | 5 | 3 | 1,500 | 61 | 1,120 | 63 | 1,070 | 41 | 1,335 | 126 | 990 | 152 | 995 | 112 | 1,005 | 48 | 1,020 |
| 3.5 | 10 | 33 | 1,235 | 141 | 1,065 | 143 | 1,030 | 105 | 1,100 | 146 | 945 | 159 | 885 | 135 | 1,020 | 138 | 920 |
| 3.5 | 15 | 81 | 1,255 | 167 | 950 | 167 | 880 | 143 | 980 | 162 | 960 | 162 | 860 | 153 | 980 | 155 | 770 |
| 3.5 | 20 | 93 | 1,210 | 177 | 805 | 185 | 860 | 153 | 925 | 175 | 865 | 166 | 740 | 180 | 825 | 164 | 755 |
| 3.5 | 40 | 120 | 1,045 | 182 | 750 | 189 | 765 | 171 | 800 | 186 | 840 | 164 | 720 | 186 | 795 | 161 | 620 |
| 3.5 | 60 | 136 | 1,060 | 186 | 865 | 186 | 710 | 171 | 750 | 182 | 805 | 159 | 700 | 192 | 780 | 149 | 570 |
| 3.5 | 90 | 139 | 1,075 | 189 | 675 | 177 | 665 | 171 | 705 | | | | | | | 133 | 540 |
| | | Loading at 300 and 500% | | | | | | | | | | | | | | | | |
| 1.5 | 10 | | | | | | | 6 | 9 | 3 | 3 | 3 | 6 | 6 | 9 | 3 | 6 | 6 | 9 |
| 1.5 | 25 | 3 | 3 | | | | | 9 | 30 | 9 | 15 | 6 | 9 | 9 | 22 | 9 | 22 | 12 | 34 |
| 1.5 | 50 | 3 | 3 | 12 | 33 | 6 | 15 | 3 | 6 | 6 | 9 | 6 | 12 | 6 | 9 | 6 | 9 |
| 3.5 | 5 | 3 | 3 | 6 | 12 | 6 | 12 | 9 | 22 | 11 | 27 | 12 | 37 | 9 | 22 | 15 | 39 |
| 3.5 | 10 | 3 | 6 | 12 | 40 | 12 | 37 | 9 | 34 | 13 | 35 | 15 | 51 | 9 | 30 | 18 | 60 |
| 3.5 | 15 | 6 | 15 | 15 | 53 | 15 | 56 | 12 | 34 | 13 | 47 | 18 | 57 | 12 | 37 | 22 | 74 |
| 3.5 | 20 | 6 | 19 | 19 | 68 | 19 | 65 | 15 | 45 | 19 | 47 | 18 | 57 | 12 | 37 | 22 | 74 |
| 3.5 | 40 | 9 | 27 | 25 | 84 | 22 | 84 | 19 | 62 | 19 | 54 | 22 | 78 | 19 | 62 | 28 | 102 |
| 3.5 | 60 | 9 | 31 | 31 | 105 | 24 | 93 | 22 | 71 | 19 | 62 | 25 | 81 | 22 | 71 | 31 | 112 |
| 3.5 | 90 | 12 | 34 | 30 | 105 | 25 | 99 | 22 | 78 | 21 | 68 | 25 | 84 | 22 | 74 | 31 | 116 |
| | | Shore hardness—elasticity (Percent Schopper) | | | | | | | | | | | | | | | | |
| 3.5 | 5 | | | 31 | | 44 | | 36 | | 46 | | | | 39 | | 42 | | 34 | | 43 | | 40 | | 43 |
| 3.5 | 10 | 41 | 38 | 46 | | 47 | | 44 | | 48 | | 40 | | 49 | | 40 | | 49 | | 45 | | 42 | | 42 | | 46 | | 45 | | 46 |
| 3.5 | 15 | 45 | 39 | 49 | | 48 | | 46 | | 48 | | 43 | | 50 | | 42 | | 50 | | 47 | | 42 | | 44 | | 44 | | 48 | | 46 |
| 3.5 | 20 | 46 | 39 | 50 | | 48 | | 46 | | 49 | | 44 | | 50 | | 45 | | 50 | | 47 | | 43 | | 45 | | 44 | | 49 | | 47 |
| 3.5 | 40 | 49 | 38 | 51 | | 49 | | 49 | | 49 | | 48 | | 48 | | 47 | | 48 | | 48 | | 45 | | 49 | | 42 | | 51 | | 48 |
| 3.5 | 60 | 49 | 38 | 54 | | 49 | | 51 | | 49 | | 48 | | 47 | | 48 | | 48 | | 49 | | 45 | | 51 | | 42 | | 53 | | 49 |
| 3.5 | 90 | 49 | 38 | 54 | | 49 | | 51 | | 49 | | 50 | | 47 | | 49 | | 47 | | 50 | | 45 | | 51 | | 42 | | 53 | | 47 |
| | | Permanent set after 1 minute and 1 hour | | | | | | | | | | | | | | | | |
| 3.5 | 5 | | | | | 72 | | 60 | | | | | | 74 | | 100 | | 70 |
| 3.5 | 10 | 100 | 100 | 14 | 22 | 14 | 19 | 12 | 35 | 12 | 25 | 15 | 21 | 9 | 39 | 15 | 19 |
| 3.5 | 15 | 60 | 30 | 14 | 21 | 13 | 13 | 14 | 22 | 14 | 22 | 17 | 14 | 11 | 23 | 16 | 10 |
| 3.5 | 20 | 55 | 20 | 13 | 13 | 12 | 12 | 14 | 16 | 13 | 17 | 13 | 13 | 12 | 22 | 14 | 9 |
| 3.5 | 40 | 33 | 19 | 11 | 9 | 11 | 9 | 13 | 10 | 13 | 15 | 12 | 8 | 14 | 13 | 11 | 6 |
| 3.5 | 60 | 28 | 13 | 10 | 7 | 10 | 7 | 12 | 9 | 12 | 13 | 11 | 8 | 12 | 11 | 9 | 5 |
| 3.5 | 90 | 25 | 12 | 10 | 6 | 9 | 6 | 12 | 8 | 11 | 12 | 11 | 7 | 11 | 10 | 8 | 4 |
| Defo | | 280/9.0 | | 260/10.3 | | 375/12.7 | | 300/11.3 | | 300/10.7 | | 325/11.3 | | 350/12.0 | | 280/10 | |

We claim:
1. In a process for the vulcanisation, with a member of the group consisting of zinc oxide and lead oxide, of a polymer of 2-chloro-butadiene-(1,3), the step which comprises using as a vulcanisation accelerator a compound of the group consisting of I and II wherein R represents a member of the group consisting of a hydrogen atom, an alkyl radical with 1–6 carbon atoms, an alkylene radical with 1–6 carbon atoms, a hydroxyalkyl radical, an aminoalkyl radical, a radical thereof containing hetero-atoms in the chain, an aralkyl radical, a cycloalkyl radical and a heterocyclic radical; $R_1$ is the same as $R_4$, and represents a member of the group consisting of a hydrogen atom, an alkyl radical with 1–6 carbon atoms, an aryl radical and a cycloalkyl radical; each of $R_2$ and $R_3$ represents a member of the group consisting of a hydrogen atom, an alkyl radical with 1–6 carbon atoms, an aryl radical, a cycloalkyl radical and an aralkyl radical; $R_5$ represents a member of the group consisting of an alkylene radical with 1–6 carbon atoms a radical thereof containing hetero-atoms in the chain, and a direct $>N$—$N<$ bond.

2. In a process for the vulcanisation, with a member of the group consisting of zinc oxide and lead oxide, of a polymer of 2-chloro-butadiene-(1,3)- the step which comprises using a 2-thio-5-methyl-perhydrotriazine-(1,3,5) is used as a vulcanisation accelerator.

3. In a process for the vulcanisation, with a member of the group consisting of zinc oxide and lead oxide, of a polymer of 2-chloro-butadiene-(1,3), the step which comprises using a 2-thio-5-allyl-perhydrotriazine-(1,3,5) is used as a vulcanisation accelerator.

4. In a process for the vulcanisation, with a member of the group consisting of zinc oxide and lead oxide, of a polymer of 2-chloro-butadiene-(1,3), the step which comprises using a 2-thio-5-isopropyl-perhydrotriazine-(1,3,5) is used as a vulcanisation accelerator.

5. In a process for the vulcanisation, with a member of the group consisting of zinc oxide and lead oxide, of a polymer of 2-chloro-butadiene-(1,3), the step which comprises using a 2-thio-5-benzyl-perhydrotriazine-(1,3,5) is used as a vulcanisation accelerator.

6. In a process for the vulcanisation, with a member of the group consisting of zinc oxide and lead oxide, of a polymer of 2-chloro-butadiene-(1,3), the step which comprises using a 2-thio-4,6-dimethyl-perhydrotriazine-(1,3,5) is used as a vulcanisation accelerator.

References Cited in the file of this patent
UNITED STATES PATENTS
2,733,243    D'Amico _____ Jan. 31, 1956